June 11, 1957  G. M. STEPHENSON  2,795,006
FISH SCALING DEVICE
Filed June 10, 1955
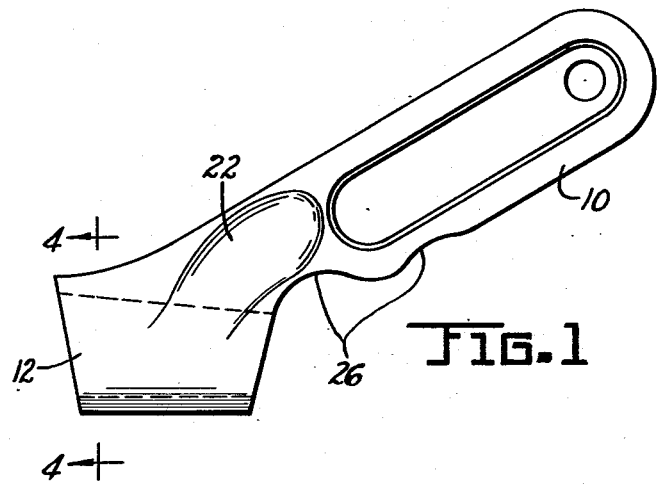
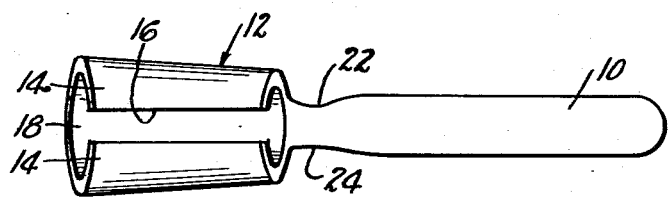
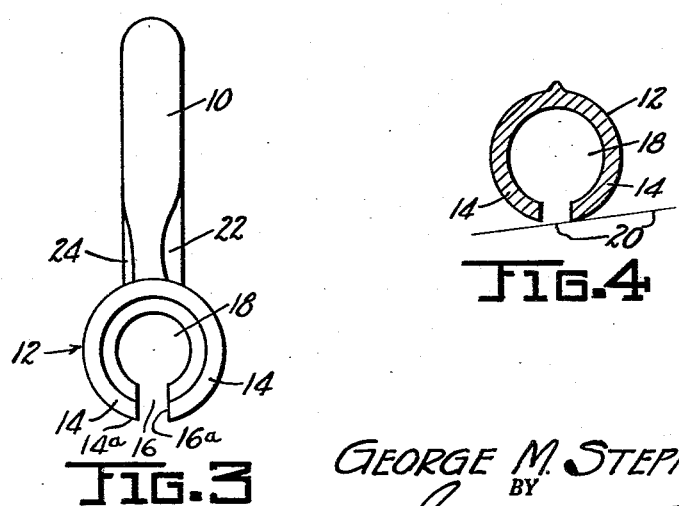
INVENTOR.
GEORGE M. STEPHENSON
BY
Eugene C. Knoblock
ATTORNEY

2,795,006

FISH SCALING DEVICE

George M. Stephenson, South Bend, Ind.

Application June 10, 1955, Serial No. 514,480

5 Claims. (Cl. 17—7)

This invention relates to improvements in fish scaling devices, and more particularly to a hand tool for use by anglers in removing scales from fish.

The primary object of the invention is to provide a device of this character which is simple in construction, inexpensive, light in weight, and easy to use.

A further object is to provide a device of ths character so constructed that the fish scales are substantially confined within the device after removal thereof so they do not become scattered over a wide area as commonly occurs with most fish scaling devices, and at the same time the device is readily cleaned of fish scales collected therein.

Other objects will be apparent from the following specification.

In the drawing:

Fig. 1 is a view of the device in side elevation;

Fig. 2 is a bottom plan view of the device;

Fig. 3 is an end view of the device; and

Fig. 4 is a transverse sectional view of the device taken on line 4—4 of Fig. 1.

Referring to the drawing which illustrates the preferred embodiment of the invention, the device comprises two parts, namely, a handle part 10 and a head part 12. These two parts may be formed integrally, as from a metal casting or may be formed in any other manner found suitable. Also the orientation of the parts with respect to each other, while preferred as here illustrated, is not critical.

The body 12 or head is of generally tubular shape and is of substantially circular cross-section on all transverse planes in the shape shown. It will be understood, however, that true circular cross-sectional shape is not essential although the provision of substantially arcuate lips 14 on opposite sides of a slot 16 is preferred. The head 12 is open at both ends so as to provide a longitudinal cavity or passage 18 therethrough which is open, preferably, only at the slot 16 in addition to the openings at its opposite ends. The head 12 has been shown as of longitudinally tapered shape but this is not essential. The slot 16 extends longitudinally full length of the head 12 in a radial direction to define opposed slot walls which are substantially parallel to each other. In one form of the invention found practical for the intended use, the slot is substantially one-quarter inch in width, but it will be understood that this dimension is illustrative and is not intended to be limiting. The width of the slot may vary within a wide range, for example, within a range from at least one-eighth inch to one-half inch or more. The width of the slot at each instance will be sufficient so that each of the longitudinal slot surfaces 16a will define an acute angled relation to the adjacent portion 14a of the outer surface of the head or to a plane 20 tangent to the outer surface at the edge defined between the outer surface and the slot wall. This edge which defines a cutting or scraping edge, is preferably substantially straight although it may be slightly curved, preferably with a slight convexity. The scraping edges will preferably be displaced less than 90 degrees circumferentially.

The handle 10 is here shown as extending lengthwise relative to the tubular head 12 and at an angle to the axis thereof. The handle may be configured in any suitable manner to fit snugly within the hand. For this purpose it may be provided with recesses or cavities 22 and 24 at opposite sides thereof, and also may be provided with concavities 26 in its lower edge so shaped and proportioned as to accommodate gripping and engagement thereof conveniently by the fingers. The handle is so oriented relative to the head that it projects laterally in a direction opposite the slot, so that the user can easily apply pressure to the device in a manner to press the scraping edges against the fish, and at the same time have freedom of movement so that the knuckles of the fingers of the hand grasping the tool are clear of the fish and need not rub thereagainst incident to the scale-removing operation.

In the use of the device the fish is supported upon any convenient table or surface and is held by one hand. The fish-scaling device is held within the other hand with the edges of the lips 14 at opposite sides of the slot 16 engaging the body of the fish from which the scales are to be removed. The device is then manipulated in a direction transverse of the slot in engagement with the body of the fish and with the application of sufficient pressure to maintain the outer surfaces of the lips 14 in constant engagement with the body of the fish. The device is moved back and forth in a scraping action, with the device held to present the slot edges transverse of the direction of movement. The device has two spaced lines or areas of contact with the fish. The leading area of contact depresses the area engaged and has a free sliding action upon the body of the fish and terminates abruptly at the slot in such a manner as to tend to tilt the fish scales at the slot outwardly and present them in the path of the second or trailing contact area which has an abrupt leading edge. In other words, the leading portion of the device has a gradual or progressive contact with the fish and tends to displace the scales into the slot where they engage the slot wall of the trailing portion to be removed thereby. The forces exerted upon the scales act in such a manner as to tend to move the scales bodily inwardly to the interior cavity 18 of the device at which they are trapped and collected. Consequently, the scattering of fish scales, which commonly attends a scraping thereof to remove them, is substantially completely eliminated. Scales are naturally sticky and tend to adhere to each other, and hence they tend to stick to the interior surfaces of the cavity 18 and to each other, so that they collect in masses which are not readily displaced or thrown from the device incident to the normal scraping action in a direction transverse of the axis of the chamber, as explained above. At the same time the collected scales can be removed easily by insertion of a finger into the end of the device to bodily remove the accumulation therefrom. The longitudinal taper of the chamber facilitates this removal operation when pressure is exerted upon the accumulation from the small end of the device. Complete cleaning of the device after use thereof is equally facilitated by the free flow of water to all exposed surfaces of the device and by the avoidance of any pockets within which scales may become trapped.

While the preferred embodiment of the invention has been illustrated and described herein, it will be understood that changes in construction may be made within the scope of the appended claims without departing from the spirit of the invention.

I claim:

1. A device for removing scales from fish, comprising a rigid tubular body of substantial thickness open at its ends and defining an uninterrupted passage therethrough, said body having a longitudinal slot extending full length thereof to provide a pair of opposed longitudinal substantially straight scraping edges defined by the exterior surface of the body and the substantially planar opposed surfaces defining said slot.

2. A device for removing scales from fish, comprising a rigid tubular body of substantial thickness open at its ends and defining an uninterrupted passage therethrough, the said body having a longitudinal slot extending full length thereof to provide a pair of opposed longitudinal substantially straight scraping edges defined by the exterior surface of the body and the substantially planar opposed surfaces defining said slot, said edges being spaced less than 90 degrees circumferentially of said body.

3. A device for removing scales from fish, comprising a rigid tubular body of substantial thickness open at its ends and defining an uninterrupted passage therethrough, the said body having a longitudinal slot extending full length thereof to provide a pair of opposed longitudinal substantially straight scraping edges defined by the exterior surface of the body and the substantially planar opposed surfaces defining said slot, and a hand grip connected to said body and spaced transversely from said slot.

4. A device for removing scales from fish, comprising a rigid tubular body of substantial thickness open at its ends and defining an uninterrupted passage therethrough, said body having a longitudinal slot extending full length thereof to provide a pair of opposed longitudinal substantially straight scraping edges defined by the exterior surface of the body and the substantially planar opposed surfaces defining said slot, said edges being defined by surfaces displaced less than 90 degrees.

5. A device for removing scales from fish, comprising a rigid tubular body of substantial thickness open at its ends and defining an uninterrupted passage therethrough, said body having a longitudinal slot extending full length thereof to provide a pair of opposed longitudinal substantially straight scraping edges defined by the exterior surface of the body and the substantially planar opposed surfaces defining said slot, said tubular body being of substantially circular cross-sectional shape.

References Cited in the file of this patent

UNITED STATES PATENTS

| | | |
|---|---|---|
| D. 146,614 | Pelka et al. | Apr. 15, 1947 |
| 1,517,762 | Stamey | Dec. 2, 1924 |
| 1,982,083 | Strand | Nov. 27, 1934 |
| 2,646,581 | Nelson | July 28, 1953 |